(12) United States Patent
Melito et al.

(10) Patent No.: US 11,232,874 B2
(45) Date of Patent: Jan. 25, 2022

(54) MULTIPLE-PATH FLOW RESTRICTOR NOZZLE

(71) Applicant: GE-Hitachi Nuclear Energy Americas LLC, Wilmington, NC (US)

(72) Inventors: Joel Patrick Melito, Wilmington, NC (US); Randy Morris Brown, Wilmington, NC (US); Zhe Zhang, Wilmington, NC (US); Robin D. Sprague, Wilmington, NC (US); Adrian M. Mistreanu, Wilmington, NC (US); Gerald A. Deaver, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 864 days.

(21) Appl. No.: 15/845,277

(22) Filed: Dec. 18, 2017

(65) Prior Publication Data

US 2019/0189297 A1 Jun. 20, 2019

(51) Int. Cl.
*G21C 13/02* (2006.01)
*G21C 15/16* (2006.01)
*F22B 37/26* (2006.01)
*G21C 13/032* (2006.01)
*B05B 7/06* (2006.01)
*B05B 1/14* (2006.01)
*B05B 1/00* (2006.01)

(52) U.S. Cl.
CPC .............. *G21C 13/022* (2013.01); *B05B 7/06* (2013.01); *F22B 37/268* (2013.01); *G21C 13/032* (2013.01); *G21C 15/16* (2013.01); *B05B 1/005* (2013.01); *B05B 1/14* (2013.01)

(58) Field of Classification Search
CPC .. B05B 1/14; B05B 7/08; B05B 1/005; B05B 7/06; G21C 13/022; G21C 15/16; G21C 13/032; F22D 37/268; F22B 37/268
USPC ..... 239/418, 423, 450, 424, 589, 590–590.5
See application file for complete search history.

(56) References Cited

U.S. PATENT DOCUMENTS 1,626,047 A * 4/1927 Morley ...................... F24C 3/08
                                                239/427.3
3,622,081 A * 11/1971 Marsh ....................... A23F 5/38
                                                239/427.3

(Continued)

FOREIGN PATENT DOCUMENTS

CN     103187113 B      3/2017
DE   10-2012-000536 B3  5/2013

(Continued)

OTHER PUBLICATIONS

Singh et al. "Effect of nozzle geometry on critical-subcritical flow transitions" Feb. 2019 (Year: 2019).*

(Continued)

*Primary Examiner* — Steven J Ganey
(74) *Attorney, Agent, or Firm* — Harness, Dickey & Pierce, P.L.C.

(57) ABSTRACT

A flow restrictor nozzle for a pressurized vessel of a nuclear reactor may comprise a nozzle body including an inlet face and an outlet face. The nozzle body may define a plurality of internal flow paths extending from the inlet face to the outlet face. Each of the plurality of internal flow paths may include a convergent section, a throat section, and a divergent section.

20 Claims, 10 Drawing Sheets

(56) References Cited

U.S. PATENT DOCUMENTS

| | | | | |
|---|---|---|---|---|
| 3,628,735 | A * | 12/1971 | Desty | F23D 17/00 |
| | | | | 239/425.5 |
| 3,878,991 | A | 4/1975 | Sabadics et al. | |
| 3,945,574 | A | 3/1976 | Polnauer et al. | |
| 4,071,403 | A | 1/1978 | Andrews et al. | |
| 4,361,285 | A | 11/1982 | Koppehele et al. | |
| 4,652,234 | A | 3/1987 | Voorheis | |
| 4,821,963 | A * | 4/1989 | Arnout | F23D 14/54 |
| | | | | 239/419.3 |
| 5,090,619 | A * | 2/1992 | Barthold | F04F 5/466 |
| | | | | 239/14.2 |
| 5,103,800 | A | 4/1992 | Bedford et al. | |
| 5,613,535 | A * | 3/1997 | Loen | B67D 7/48 |
| | | | | 141/209 |
| 6,415,991 | B1 * | 7/2002 | Eriksson | B05B 1/005 |
| | | | | 239/290 |
| 6,585,063 | B2 * | 7/2003 | Larsen | E21B 10/18 |
| | | | | 175/340 |
| 6,969,489 | B2 * | 11/2005 | Freeman | B01L 3/5025 |
| | | | | 422/50 |
| 6,993,979 | B2 * | 2/2006 | Segeral | G01F 1/44 |
| | | | | 73/861.64 |
| 7,270,713 | B2 * | 9/2007 | Blonigan | C23C 16/455 |
| | | | | 118/715 |
| 7,370,675 | B2 * | 5/2008 | Cancade | F16L 55/027 |
| | | | | 137/547 |
| 8,312,931 | B2 * | 11/2012 | Xu | E21B 43/12 |
| | | | | 166/373 |
| 8,646,486 | B2 * | 2/2014 | Schommer | E03C 1/08 |
| | | | | 138/44 |
| 8,908,078 | B2 | 12/2014 | Takanezawa et al. | |
| 9,091,429 | B2 | 7/2015 | Wepfer | |
| 9,463,342 | B2 * | 10/2016 | Ivy | A62C 31/05 |
| 9,919,117 | B2 * | 3/2018 | Hoekman | A61M 15/0021 |
| 10,699,918 | B2 * | 6/2020 | Jung | B08B 3/08 |
| 2004/0069534 | A1 | 4/2004 | Larsen et al. | |
| 2008/0006725 | A1 | 1/2008 | Jameel et al. | |
| 2013/0032100 | A1 | 2/2013 | Wepfer | |
| 2013/0306759 | A1 * | 11/2013 | Schutt | B01F 7/0075 |
| | | | | 239/428 |
| 2014/0083467 | A1 * | 3/2014 | Dehn | A47L 11/4086 |
| | | | | 134/37 |
| 2018/0056100 | A1 * | 3/2018 | Cockerham | A62C 4/00 |
| 2018/0056101 | A1 * | 3/2018 | Cockerham | A62C 4/02 |
| 2019/0051499 | A1 * | 2/2019 | Srikantaiah | B05B 1/005 |
| 2019/0189297 | A1 * | 6/2019 | Melito | G21C 13/032 |
| 2019/0371481 | A1 * | 12/2019 | Fukui | B01D 63/02 |

FOREIGN PATENT DOCUMENTS

| | | |
|---|---|---|
| EP | 0681301 A1 | 11/1995 |
| EP | 2549180 A1 | 1/2013 |
| JP | H08-007274 A | 1/1996 |
| JP | 28-11682 B2 | 10/1998 |
| JP | 2006-300535 A | 11/2006 |
| WO | WO-94/17330 A1 | 8/1994 |

OTHER PUBLICATIONS

Davenport "Nozzle Applet", Jan. 2001 (Year: 2001).*
Robinson, "Flow through a De Laval Nozzle", Dec. 2016 (Year: 2016).*
International Search Report and Written Opinion for corresponding PCT Application No. PCT/US2018/062632 dated Sep. 25, 2019.
Extended European Search Report dated Aug. 6, 2021 for corresponding European Application No. 18907542.7.

* cited by examiner

MULTIPLE-PATH FLOW RESTRICTOR NOZZLE

BACKGROUND

Field

The present disclosure relates to devices for restricting a flow of a gas from a pressurized vessel.

Description of Related Art

Conventional devices for restricting a flow of a gas from a pressurized vessel may include movable components configured to actuate to provide the requisite flow restriction (e.g., during a steam line break). However, the presence of movable components increases the complexity of the device while also raising the risk of failure.

SUMMARY

A flow restrictor nozzle for a pressurized vessel of a nuclear reactor may comprise a nozzle body including an inlet face and an outlet face. The nozzle body may define a plurality of internal flow paths extending from the inlet face to the outlet face. Each of the plurality of internal flow paths may include a convergent section, a throat section, and a divergent section.

The nozzle body may be a passive structure with no moving parts.

The nozzle body may be a monolithic structure.

The plurality of internal flow paths may extend in parallel through the nozzle body.

The throat section may be closer to the inlet face than the outlet face of the nozzle body.

The convergent section may have a first area at the inlet face. The divergent section may have a second area at the outlet face. The throat section may have a third area at a narrowest part of the throat section. The third area may be less than the first area and the second area.

The convergent section may have a first length. The divergent section may have a second length. The first length may be less than the second length.

The plurality of internal flow paths may include a central flow path and peripheral flow paths surrounding the central flow path.

The throat section of the central flow path may be farther from the inlet face of the nozzle body than the throat section of each of the peripheral flow paths.

The nozzle body may further define a channel extending from an exterior of the nozzle body to at least one of the central flow path and the peripheral flow paths.

The channel may extend inward at an angle toward the inlet face of the nozzle body.

The channel may extend between adjacent peripheral flow paths of the plurality of internal flow paths.

The channel may extend to the throat section of at least one of the central flow path and the peripheral flow paths.

The nozzle body may further include a connection stub protruding from the exterior of the nozzle body. The connection stub may define an interior passage in fluidic communication with the channel.

A method of restricting a flow from a pressurized vessel of a nuclear reactor may comprise securing a flow restrictor nozzle to the pressurized vessel. The flow restrictor nozzle may have a nozzle body including an inlet face and an outlet face. The nozzle body may define a plurality of internal flow paths extending from the inlet face to the outlet face. Each of the plurality of internal flow paths may include a convergent section, a throat section, and a divergent section. The method may additionally comprise directing the flow from the pressurized vessel through the plurality of internal flow paths of the flow restrictor nozzle.

The securing may include welding the flow restrictor nozzle to an exterior of the pressurized vessel. The flow restrictor nozzle may be a monolithic structure.

Alternatively, the securing may include attaching a fi section of the flow restrictor nozzle to the pressurized vessel and attaching a second section of the flow restrictor nozzle to the first section.

The directing of the flow may result in a choked flow exiting the flow restrictor nozzle.

The directing of the flow may result a stabilized flow exiting at equal velocity from the flow restrictor nozzle.

A method of manufacturing a flow restrictor nozzle for a pressurized vessel of a nuclear reactor may comprise fabricating a nozzle body including an inlet face and an outlet face. The nozzle body may define a plurality of internal flow paths extending from the inlet face to the outlet face. Each of the plurality of internal flow paths may include a convergent section, a throat section, and a divergent section. The method may additionally comprise independently shaping, sizing, and positioning the convergent section of each of the plurality of internal flow paths on the inlet face based on predicted pressure variances of the pressurized vessel. The method may further comprise independently spacing the throat section of each of the plurality of internal flow paths relative to the inlet face to mitigate acoustic wave reinforcement.

BRIEF DESCRIPTION OF THE DRAWINGS

The various features and advantages of the non-limiting embodiments herein may become apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
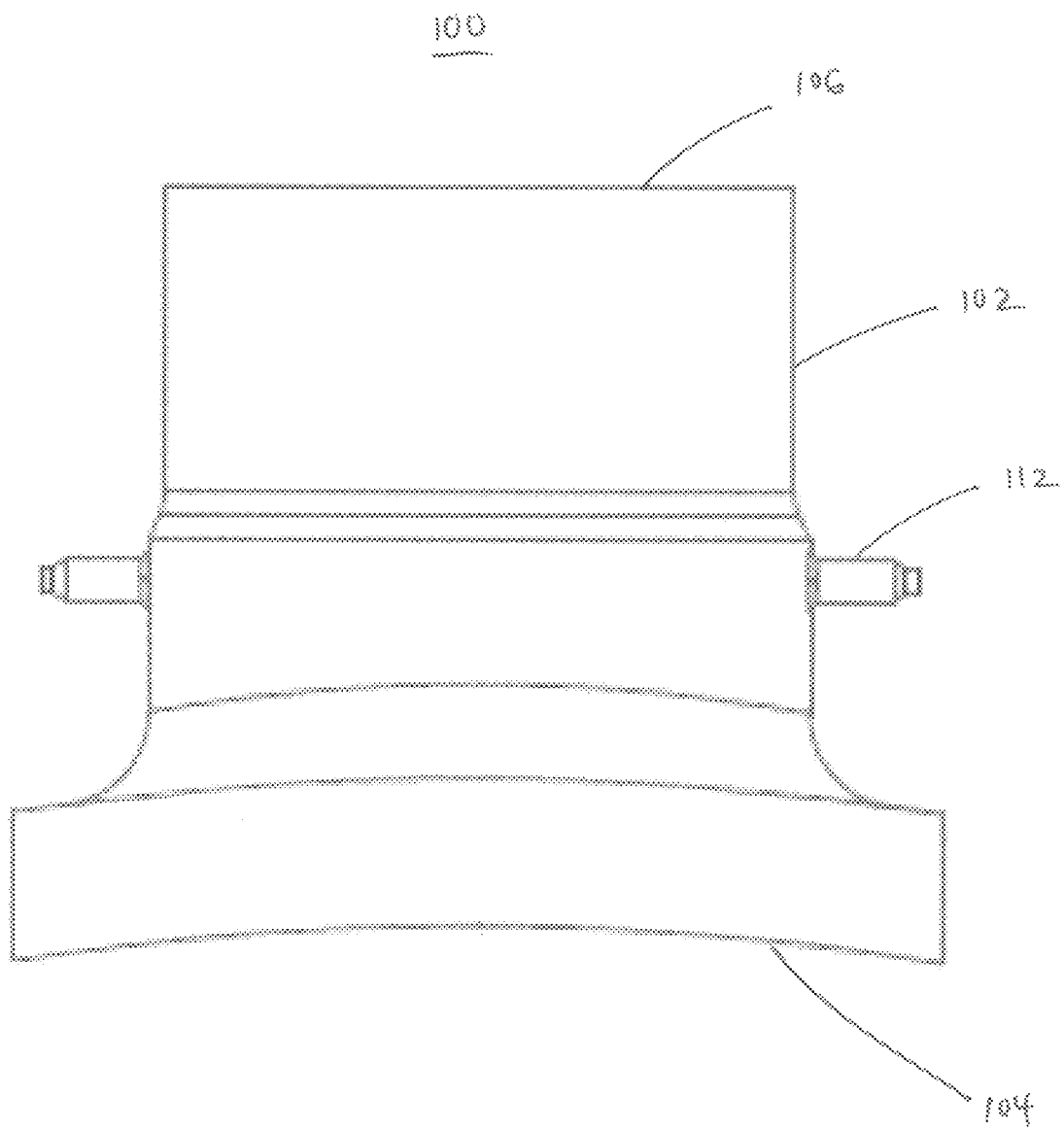
FIG. 1 is side view of a flow restrictor nozzle for a pressurized vessel of a nuclear reactor according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is side view of a flow restrictor nozzle for a pressurized vessel of a nuclear reactor according to an example embodiment. Referring to FIG. 1, the flow restrictor nozzle 100 comprises a nozzle body 102 including an inlet face 104 and an outlet face 106. The nozzle body 102 may define a plurality of internal flow paths extending from the inlet face 104 to the outlet face 106. Each of the plurality of internal flow paths may include a convergent section, a throat section, and a divergent section.

The inlet face 104 of the flow restrictor nozzle 100 may be a flanged section of the nozzle body 102, while the outlet face 106 of the flow restrictor nozzle 100 may be a tapered section of the nozzle body 102. Thus, the inlet face 104 may have a larger circumference and surface area than the outlet face 106. The flanged section of the nozzle body 102 may facilitate the attachment of the flow restrictor nozzle 100 to a pressurized vessel (e.g., steam generation vessel) of a nuclear reactor. Although the inlet face 104 is shown as being concave, it should be understood that, in an alternative embodiment, the inlet face 104 may be convex depending on the target surface to which the flow restrictor nozzle 100 will be mounted.

The nozzle body 102 may further include an instrument tap or a connection stub 112 protruding from the exterior of the nozzle body 102. For example, two oppositely-arranged connection stubs 112 may be provided. A pressure sensor may be connected to the connection stubs 112. The nozzle body 102 may be a passive structure with no moving parts. For example, the nozzle body 102 may be a monolithic structure.

Figure 2:
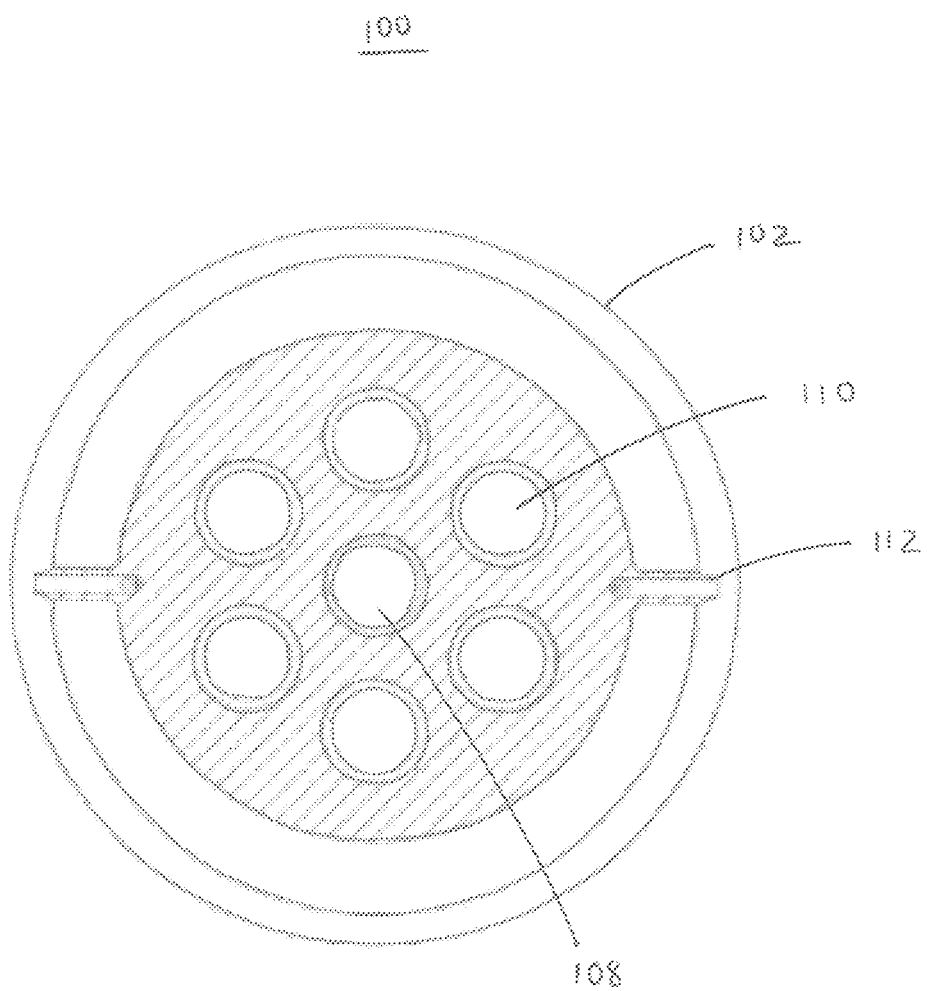
FIG. 2 is an outlet end view of a cross-section of the flow restrictor nozzle of FIG. 1.

FIG. 2 is an outlet end view of a cross-section of the flow restrictor nozzle of FIG. 1. Referring to FIG. 2, the nozzle body 102 of the flow restrictor nozzle 100 has a circular cross-section, although example embodiments are not limited thereto. For instance, the nozzle body 102 may alternatively have a polygonal cross-section.

The nozzle body 102 defines a plurality of internal flow paths extending therethrough. The plurality of internal flow paths may be arranged in an evenly-spaced array (e.g., hexagonal lattice, triangular lattice) and centered within the nozzle body 102. In an example embodiment, the plurality of internal flow paths may be of the same cross-sectional shape and size. For instance, each of the plurality of internal flow paths may have a circular cross-sectional shape or other shape (e.g., elliptical cross-sectional shape). The plurality of internal flow paths may include a central flow path 108 and peripheral flow paths 110 surrounding the central flow path 108. The central flow path 108 may coincide with the central longitudinal axis of the nozzle body 102. Each of the peripheral flow paths 110 may be spaced equidistantly from the central flow path 108 as well as from adjacent peripheral flow paths 110. Although six peripheral flow paths 110 are shown, it should be understood that a different number may be implemented depending on the conditions.

Each of the connection stubs 112 may be positioned between adjacent peripheral flow paths 110 while also being radially oriented so as point towards the center of the nozzle body 102 and, thus, the central flow path 108. The connection stubs 112 may be arranged at the 9 o'clock and 3 o'clock positions so as to be about 180 degrees apart.

Figure 3:
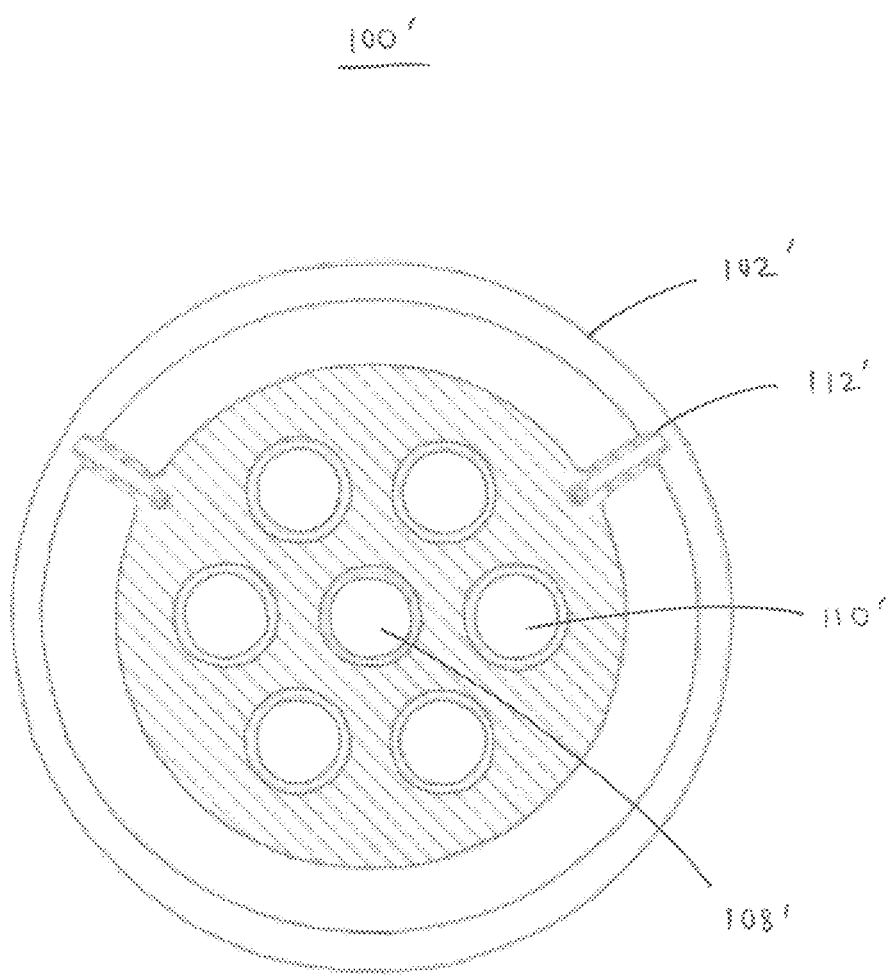
FIG. 3 is an outlet end view of a cross-section of another flow restrictor nozzle according to an example embodiment.

FIG. 3 is an outlet end view of a cross-section of another flow restrictor nozzle according to an example embodiment. Referring to FIG. 3, the flow restrictor nozzle 100', with the exception of the connection stubs 112', may be as described in connection with the flow restrictor nozzle 100 of FIG. 2. In particular, the nozzle body 102', the central flow path 108', and the peripheral flow paths 110' of FIG. 3 may correspond to the nozzle body 102, the central flow path 108, and the peripheral flow paths 110 of FIG. 2. Thus, in the interest of brevity, the corresponding disclosures previously set forth will not be repeated in this section.

As shown in FIG. 3, each of the connection stubs 112' may be positioned between adjacent peripheral flow paths 110' while also being radially oriented so as point towards the center of the nozzle body 102' and, thus, the central flow path 108'. The connection stubs 112' may be arranged at the 10 o'clock and 2 o'clock positions so as to be 120 degrees apart. However, it should be understood that if the view of the flow restrictor nozzle 100' was rotated (e.g., clockwise), the connection stubs 112' may be regarded as being arranged at the 12 o'clock and 4 o'clock positions (or other positions depending on the rotation). In any event, the connection stubs 112' shown in FIG. 3 may be about 120 degrees apart regardless of the rotation.

Figure 4:
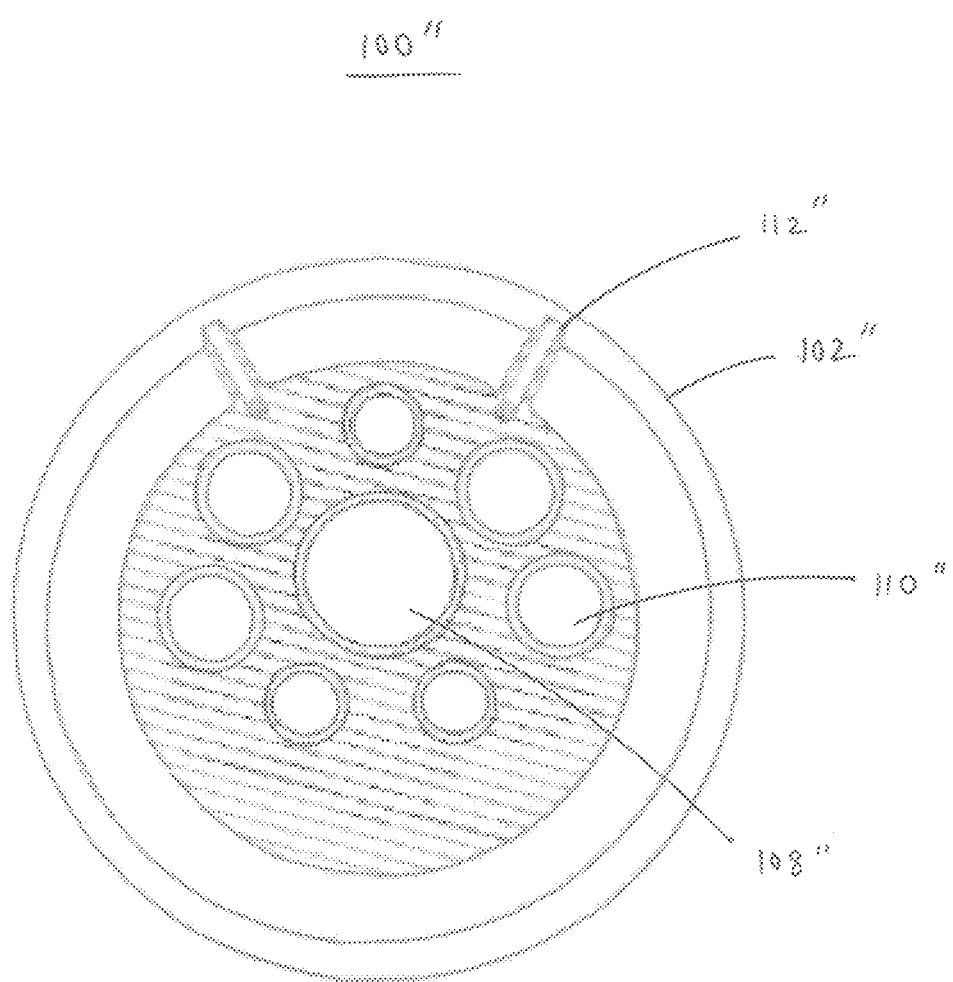
FIG. 4 is an outlet end view of a cross-section of another flow restrictor nozzle according to an example embodiment.

FIG. 4 is an outlet end view of a cross-section of another flow restrictor nozzle according to an example embodiment. Referring to FIG. 4, the flow restrictor nozzle 100" may be as generally described in connection with the flow restrictor nozzle 100 of FIG. 2. Thus, in the interest of brevity, the corresponding disclosures previously set forth will not be repeated in this section. The differences shown in the flow restrictor nozzle 100" of FIG. 4 are discussed below.

As shown in the flow restrictor nozzle 100" of FIG. 4, the plurality of internal flow paths may be shifted to one side of the nozzle body 102" (rather than being centered within the nozzle body 102"). The plurality of internal flow paths may be of the same cross-sectional shape (e.g., circular cross-sectional shape) but of different sizes. In an example embodiment, the central flow path 108" may be larger than the peripheral flow paths 110". The central flow path 108" may also be off-center relative the central longitudinal axis of the nozzle body 102". The peripheral flow paths 110" may differ from each other in size. For instance, four of the peripheral flow paths 110" may be of an intermediate size (relative to the central flow path 108"), while three of the peripheral flow paths 110" may be of a smaller size, although example embodiments are not limited thereto. In addition, one or more of the peripheral flow paths 110" may have different spacings from the central flow path 108" as well from each other. Furthermore, even though one central flow path 108" and seven peripheral flow paths 110" are shown, it should be understood that a different number may be implemented depending on the conditions.

Each of the connection stubs 112" may be positioned between adjacent peripheral flow paths 110" while also being radially oriented so as point towards the central flow path 108". The connection stubs 112" may be arranged at the 11 o'clock and 1 o'clock positions as to be 60 degrees apart. However, it should be understood that if the view of the flow restrictor nozzle 100" was rotated (e.g., clockwise), the connection stubs 112' may be regarded as being arranged at the 12 o'clock and 2 o'clock positions (or other positions depending on the rotation). In any event, as shown in FIG. 4, the connection stubs 112' will be 60 degrees apart regardless of the rotation.

Figure 5:
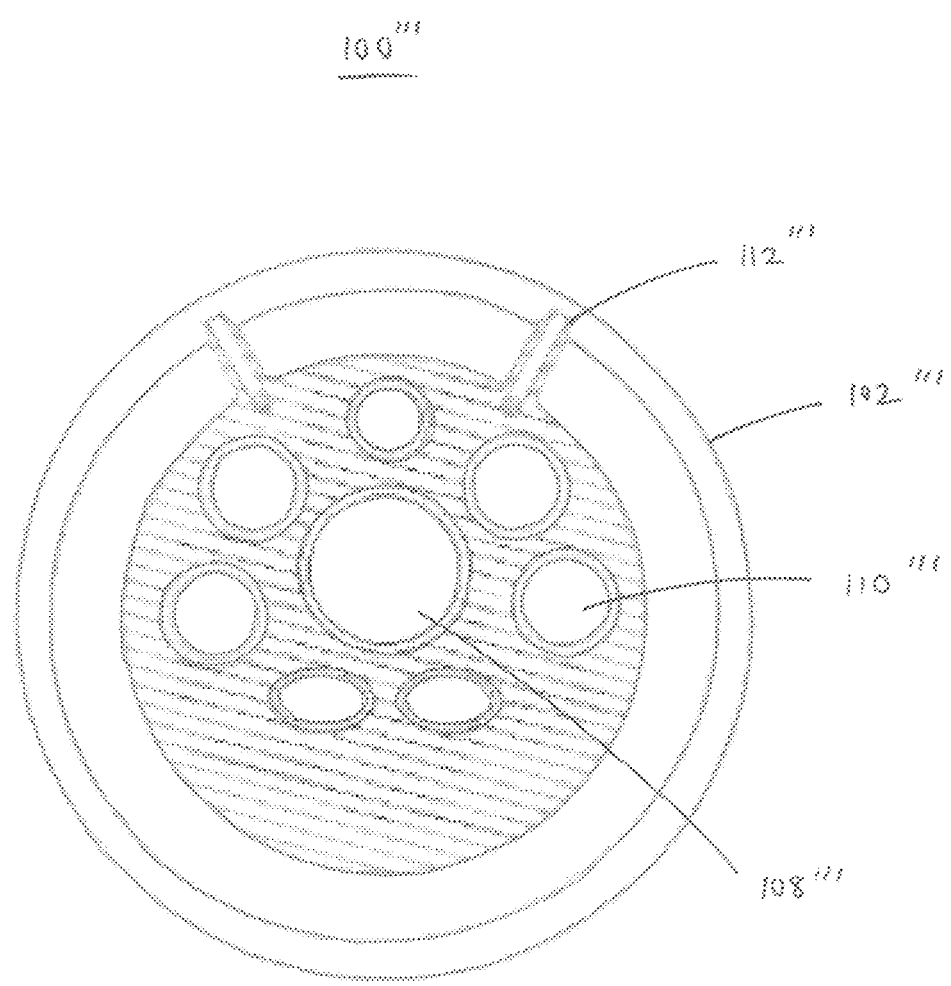
FIG. 5 is an outlet end view of a cross-section of another flow restrictor nozzle according to an example embodiment.

FIG. 5 is an outlet end view of a cross-section of another flow restrictor nozzle according to an example embodiment. Referring to FIG. 5, the flow restrictor nozzle 100''', with the exception of the peripheral flow paths 110''', may be as described in connection with the flow restrictor nozzle 100" of FIG. 4. In particular, the nozzle body 102''', the central flow path 108''', and the connection stubs 112''' of FIG. 5 may correspond to the nozzle body 102", the central flow path 108", and the connection stubs 112" of FIG. 4. Thus, in the interest of brevity, the corresponding disclosures previously set forth will not be repeated in this section. The differences shown in the flow restrictor nozzle 100''' of FIG. 5 are discussed below.

As shown in FIG. 5, the peripheral flow paths 110''' may differ from each other in cross-sectional size and shape. For instance, in addition to four of the peripheral flow paths 110''' being of an intermediate size and three of the peripheral flow paths 110''' being of a smaller size, two of the smaller-sized peripheral flow paths 110''' may have an elliptical cross-sectional shape. Although not shown, it should be understood that, depending on the conditions, the nozzle body 102''' may be alternatively configured such that the central flow path 108''' is smaller in size than the peripheral flow paths 110'''. Furthermore, the central flow path 108''' may have a different shape (e.g., elliptical cross-sectional shape) than as shown.

Figure 6:
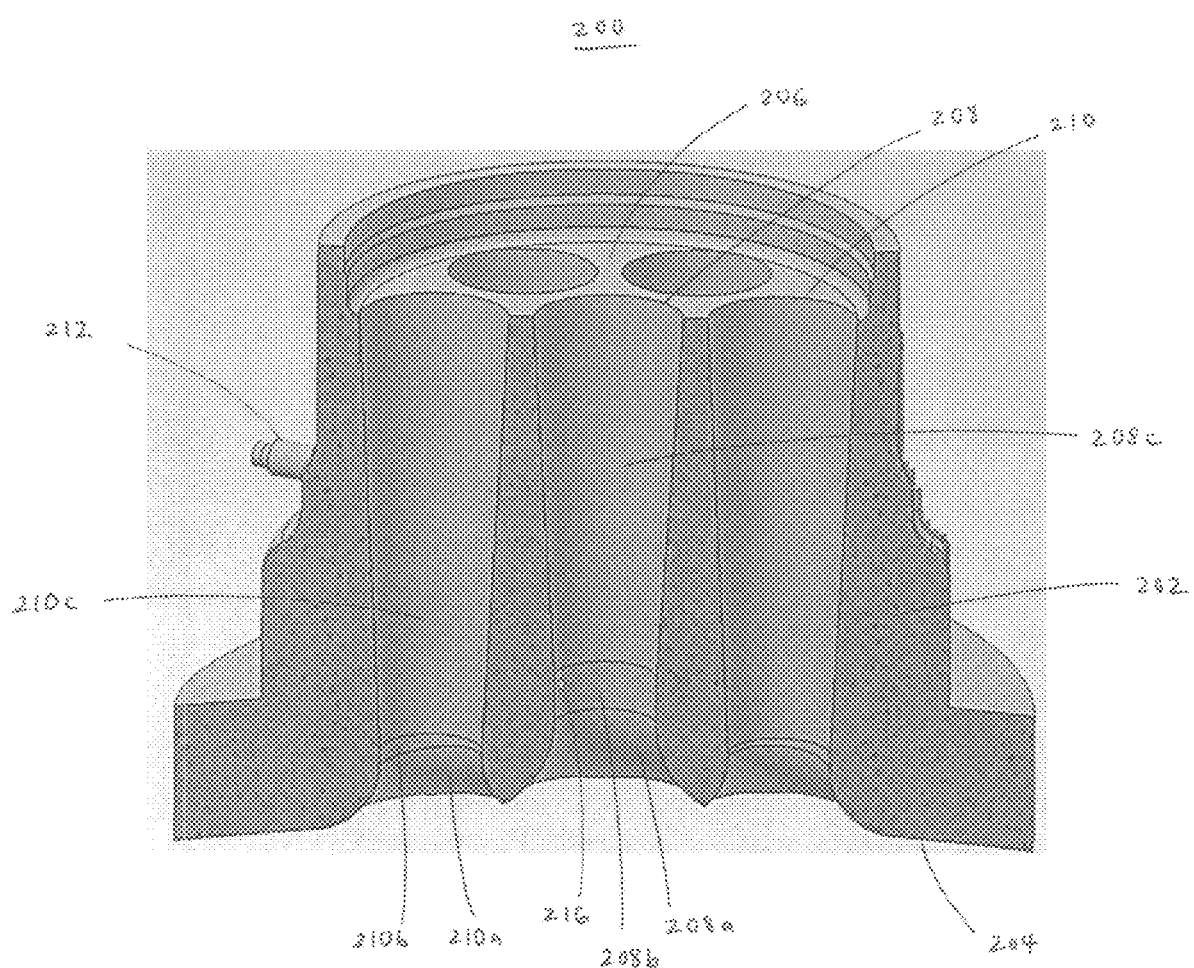
FIG. 6 is an upper perspective view of a cross-section of a flow restrictor nozzle for a pressurized vessel of a nuclear reactor according to an example embodiment.

FIG. 6 is an upper perspective f a cross-section of a flow restrictor nozzle for a pressurized vessel of a nuclear reactor according to an example embodiment. Referring to FIG. 6, the flow restrictor nozzle 200 comprises a nozzle body 202 including an inlet face 204 and an outlet face 206. The nozzle body 202 defines a plurality of internal flow paths extending from the inlet face 204 to the outlet face 206. The plurality of internal flow paths in FIG. 6 may correspond to the plurality of internal flow paths in FIG. 2, although example embodiments are not limited thereto. In FIG. 6, the plurality of internal flow paths may extend in parallel through the nozzle body 202. Each of the plurality of internal flow paths may include a convergent section, a throat section, and a divergent section. In a non-limiting embodiment, the throat section of each of the plurality of internal flow paths is closer to the inlet face 204 than the outlet face 206 of the nozzle body 202.

As shown in FIG. 6, the plurality of internal flow paths include a central flow path 208 and peripheral flow paths 210 surrounding the central flow path 208. The central flow path 208 includes a convergent section 208a, a throat section 208b, and a divergent section 208c, while each of the peripheral flow paths 210 includes a convergent section 210a, a throat section 210b, and a divergent section 210c. The central flow path 208 may coincide with the central longitudinal axis of the nozzle body 202. Each of the peripheral flow paths 210 may be spaced equidistantly from the central flow path 208 as well as from adjacent peripheral flow paths 210, although example embodiments are not limited thereto.

The inlet face 204 of the flow restrictor nozzle 200 may be a flanged section of the nozzle body 202, while the outlet face 206 of the flow restrictor nozzle 200 may be a tapered section of the nozzle body 202. Thus, the inlet face 204 may have a larger circumference and surface area than the outlet face 206. The flanged section of the nozzle body 202 may facilitate the attachment of the flow restrictor nozzle 200 to a pressurized vessel (e.g., steam generation vessel) of a nuclear reactor. Although the inlet face 204 is shown as being concave, it should be understood that, in an alternative embodiment, the inlet face 204 may be convex depending on the target surface to which the flow restrictor nozzle 200 will be mounted.

The nozzle body 202 may further include an instrument tap or a connection stub 212 protruding from the exterior of the nozzle body 202. For example, two oppositely-arranged connection stubs 212 may be provided. A pressure sensor may be connected to the connection stubs 212. The connection stub 212 may be in fluidic communication with the throat section 208b of the central flow path 208 via an opening 216. In another instance, although not shown, the opening 216 may be alternatively (or additionally) disposed in the throat section 210b of the peripheral flow path 210 so that the connection stub 212 is in fluidic communication with the throat section 210b via the opening 216. Furthermore, the nozzle body 202 may be a passive structure with no moving parts. For example, the nozzle body 202 may be a monolithic structure.

Figure 7:
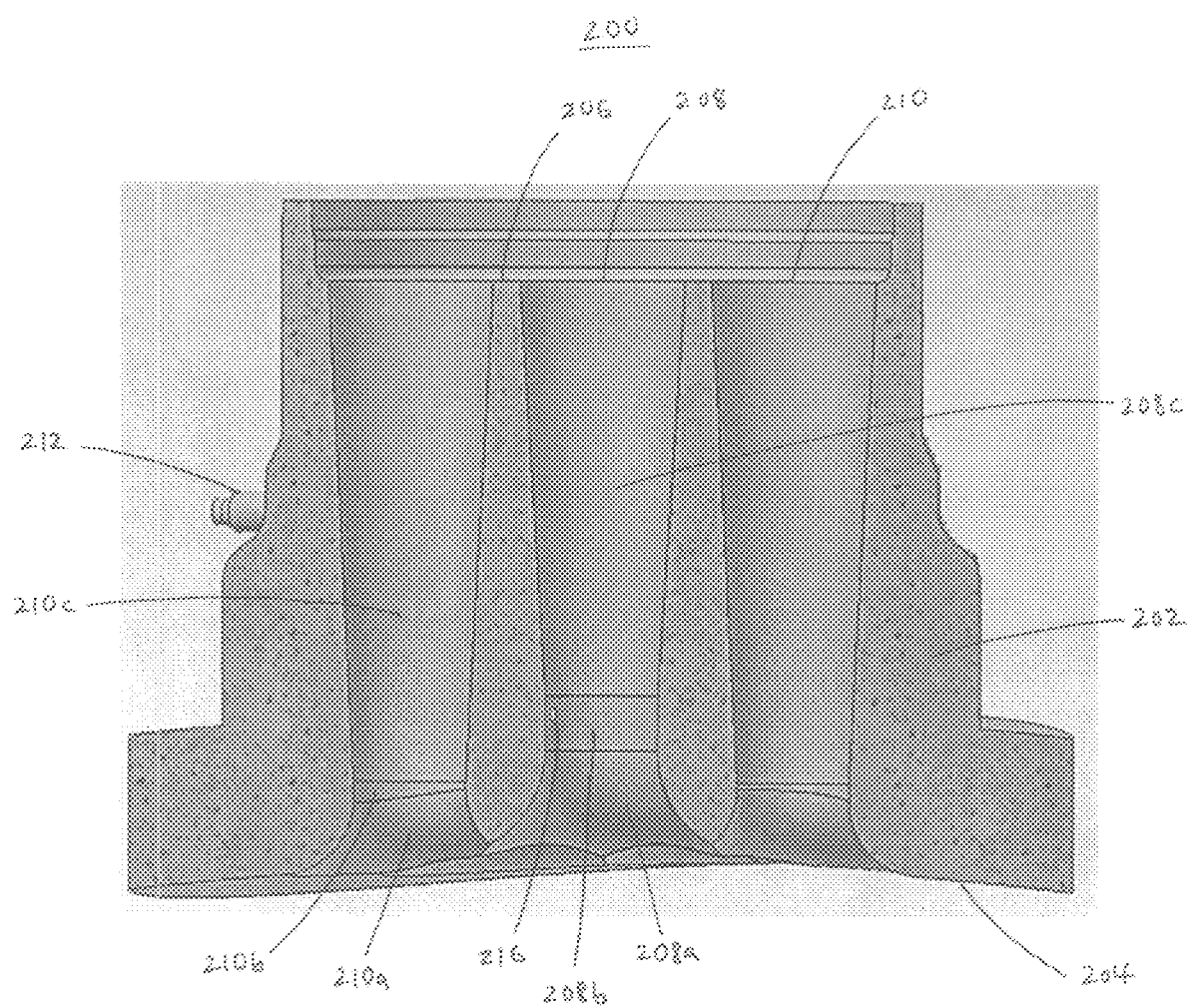
FIG. 7 is a side view of the cross-section of the flow restrictor nozzle of FIG. 6.

FIG. 7 is a side view of the cross-section of the flow restrictor nozzle of FIG. 6. Referring to FIG. 7, the convergent section 208a of the central flow path 208 may have a first area at the inlet face 204 of the nozzle body 202. The divergent section 208c of the central flow path 208 may have a second area at the outlet face 206 of the nozzle body 202. The throat section 208b of the central flow path 208 may have a third area at a narrowest part of the throat section 208b. The third area of the central flow path 208 may be less than the first area and the second area.

Similarly, with regard to the peripheral flow paths 210, the convergent section 210a of each of the peripheral flow path 210 may have a first area at the inlet face 204 of the nozzle body 202. The divergent section 210c of each of the peripheral flow paths 210 may have a second area at the outlet face 206 of the nozzle body 202. The throat section 210b of each of the peripheral flow paths 210 may have a third area at a narrowest part of the throat section 210b. The third area of each of the peripheral flow paths 210 may be less than the first area and the second area.

In addition, the convergent section 208a of the central flow path 208 may have a first length. The divergent section 208c of the central flow path 208 may have a second length. The first length of the central flow path 208 may be less than the second length.

Similarly, with regard to the peripheral flow paths 210, the convergent section 210a of each of the peripheral flow paths 210 may have a first length. The divergent section 210c of each of the peripheral flow paths 210 may have a second length. The first length of each of the peripheral flow paths 210 may be less than the second length.

Furthermore, the throat section 208b of the central flow path 208 may be farther from the inlet face 204 of the nozzle body 202 than the throat section 210b) of each of the peripheral flow paths 210. In such an instance, during the use of the flow restrictor nozzle 200 in connection with a pressurized vessel of a nuclear reactor, the throat section 208b of the central flow path 208 will be more downstream relative to the throat section 210b of each of the peripheral flow paths 210.

Figure 8:
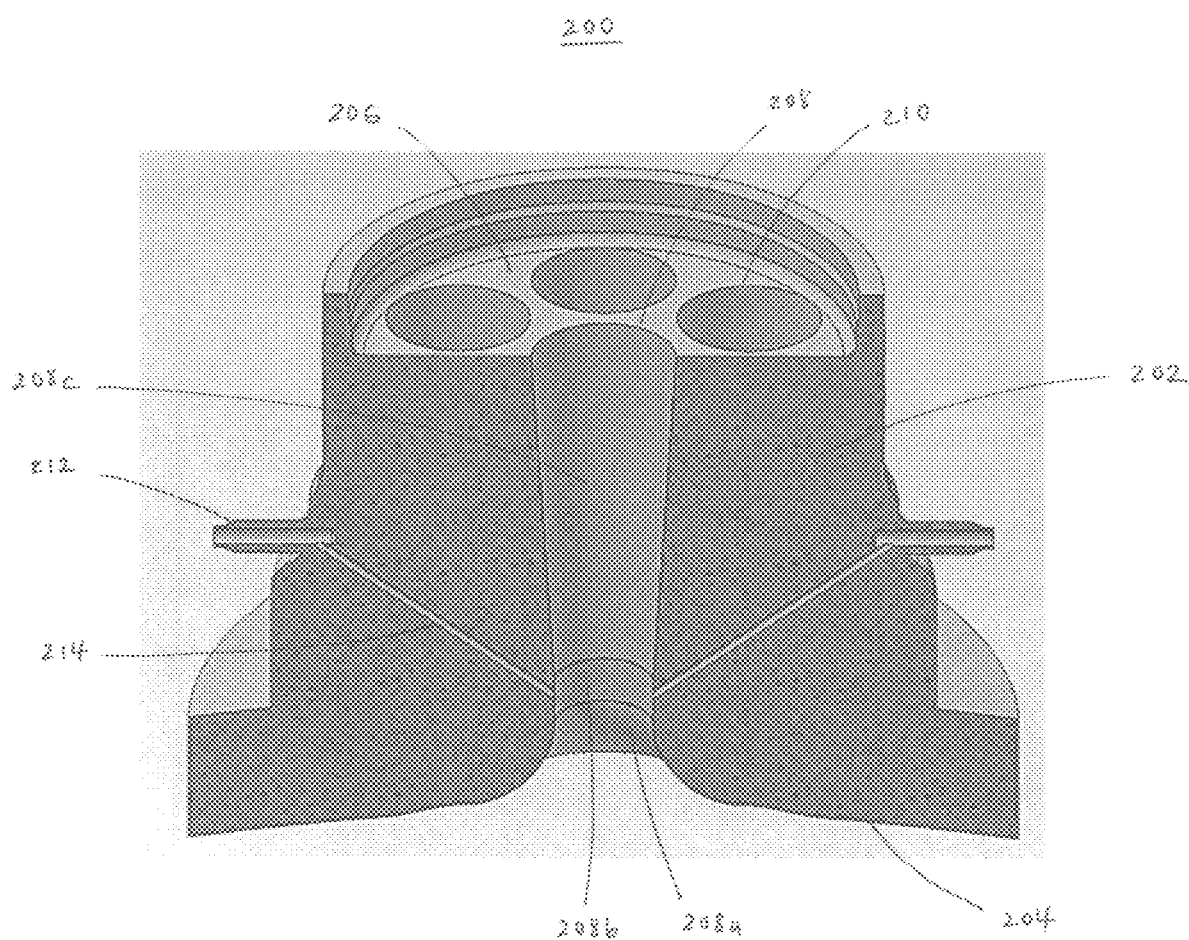
FIG. 8 is an upper perspective view of another cross-section of the flow restrictor nozzle of FIG. 6.

FIG. 8 is an upper perspective view of another cross-section of the flow restrictor nozzle of FIG. 6. In particular, the cross-section of the flow restrictor nozzle 200 in FIG. 8 is between adjacent peripheral flow paths 210 of the nozzle body 202. Referring to FIG. 8, the nozzle body 202 may further define a pair of channels 214 extending from an exterior of the nozzle body 202 to the central flow path 208. Each of the connection stubs 212 may define an interior passage in fluidic communication with a corresponding one of the channels 214. As a result, the channels 214 may fluidically connect the connection stubs 212 to the throat section 208b of the central flow path 208. In addition, as shown in FIG. 8, the channels 214 extend between adjacent peripheral flow paths 210 of the plurality of internal flow paths. According to an example embodiment, the connection stubs 212 and the channels 214 may be diametrically and symmetrically arranged such that the opposing connection stubs 212 and associated channels 214 mirror each other. In another instance, although not shown, the channels 214 may also be provided so as to fluidically connect the connection stubs 212 to the throat section 210b of one or more of the peripheral flow paths 210.

Figure 9:
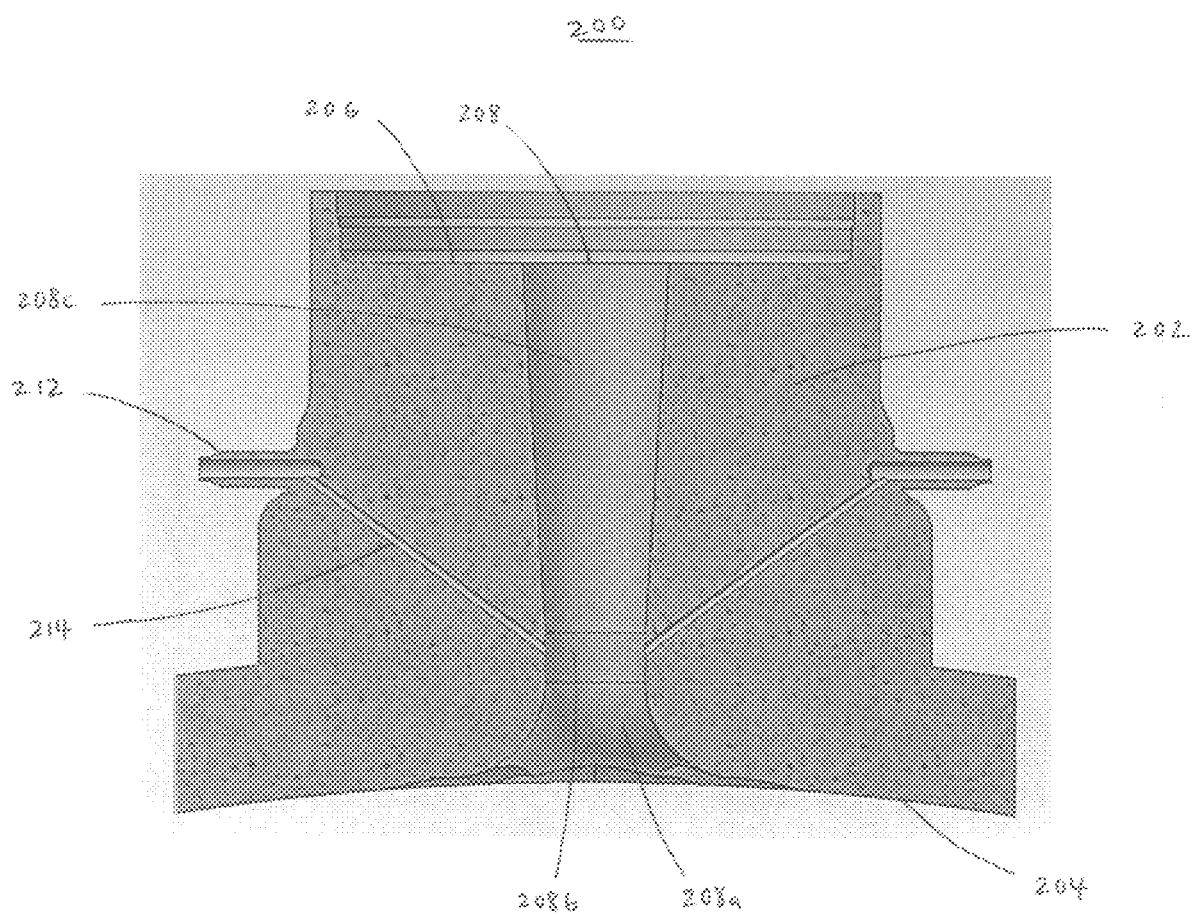
FIG. 9 is a side view of the cross-section of the flow restrictor nozzle of FIG. 8.

FIG. 9 is a side view of the cross-section of the flow restrictor nozzle of FIG. 8. Referring to FIG. 9, the channels 214 may extend inward at an angle toward the inlet face 204 of the nozzle body 202. According to an example embodiment, the channels 214 extend to the throat section 208b of the central flow path 208. The channels 214 may be regarded as converging at the throat section 208b of the central flow path 208, although different openings 216 (FIG. 6) are associated with each channel 214. Furthermore, the connection stubs 212 may be arranged at approximately a midway point between the inlet face 204 and the outlet face 206 of the nozzle body 202, although example embodiments are not limited thereto.

Figure 10:
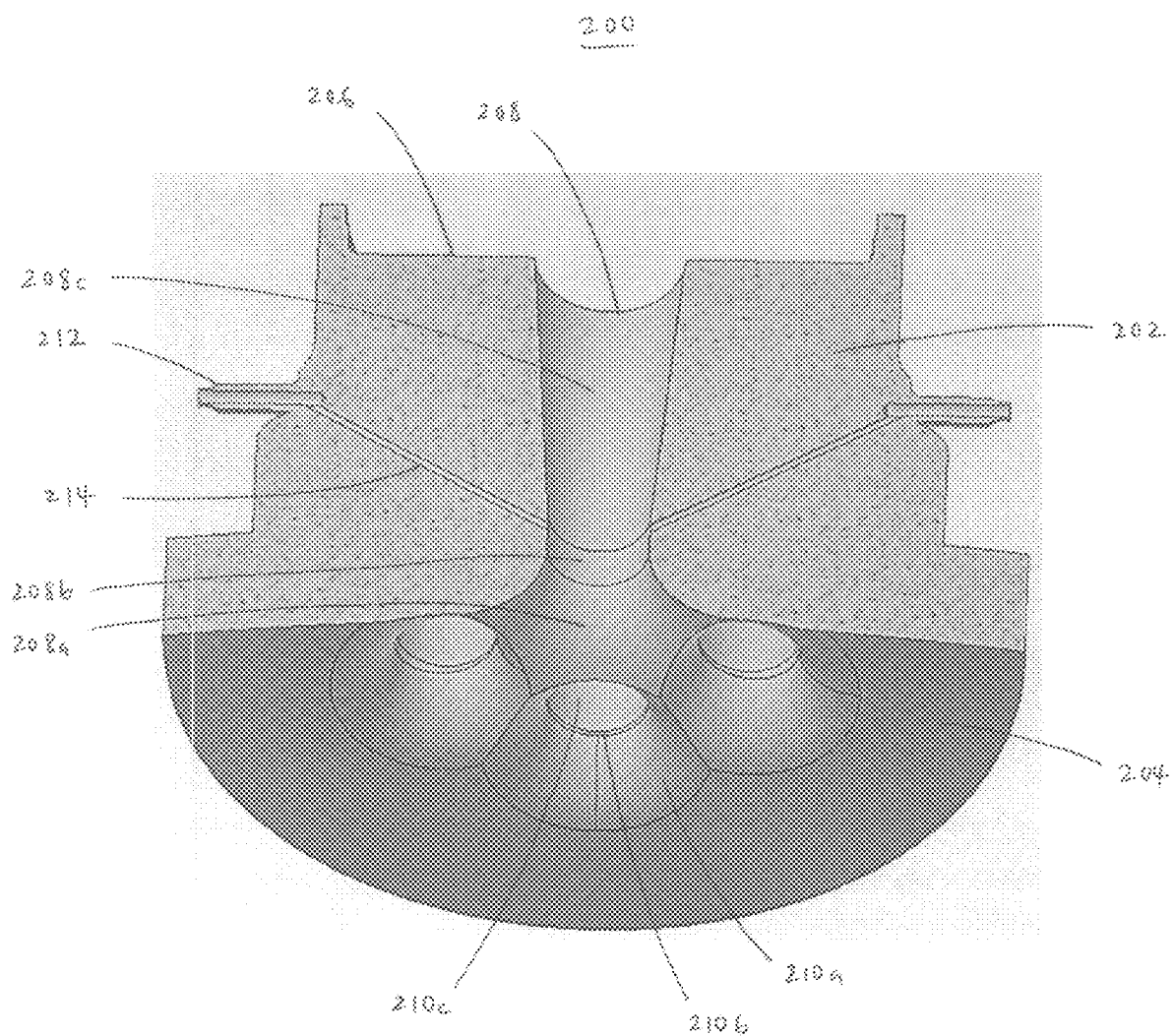
FIG. 10 is a lower perspective view of the cross-section of the flow restrictor nozzle of FIG. 8.

FIG. 10 is a lower perspective view of the cross-section of the flow restrictor nozzle of FIG. 8. Referring to FIG. 10, the convergent section 208a of the central flow path 208 and the convergent sections 210a of the peripheral flow paths 210 may be directly adjacent to one another so as to have shared boundaries at the inlet face 204 of the nozzle body 202. For instance, the boundary of a convergent section 210a of one of the peripheral flow paths 210 at the inlet face 204 of the nozzle body 202 may also form a part of the boundaries of two of the convergent sections 210a of the peripheral flow paths 210 adjacent to it. In addition, the boundaries of the convergent sections 210a of the peripheral flow paths 210 may form the boundary of the convergent section 208a of the central flow path 208 at the inlet face 204 of the nozzle body 202.

The flow restrictor nozzles disclosed herein may be used to restrict a flow from a pressurized vessel of a nuclear reactor. With reference to FIGS. 6-10 as an example, a method of restricting a flow from a pressurized vessel of a nuclear reactor may comprise securing a flow restrictor nozzle 200 to the pressurized vessel. The flow restrictor nozzle 200 may have a nozzle body 202 including an inlet face 204 and an outlet face 206. The nozzle body 202 may define a plurality of internal flow paths extending from the inlet face 204 to the outlet face 206. Each of the plurality of internal flow paths may include a convergent section, a throat section, and a divergent section. The method may additionally comprise directing the flow from the pressurized vessel through the plurality of internal flow paths of the flu restrictor nozzle 200.

The securing may include welding the flow restrictor nozzle 200 to an exterior of the pressurized vessel. The flow restrictor nozzle 200 may be a monolithic structure. Alternatively, the securing may include attaching a first section of the flow restrictor nozzle to the pressurized vessel and attaching a second section of the flow restrictor nozzle to the first section.

The directing of the flow may result in a choked flow exiting the flow restrictor nozzle 200. The directing of the flow may also result in a stabilized flow exiting at equal velocity from the flow restrictor nozzle 200.

Furthermore, with reference to FIGS. 6-1.0 as an example, a method of manufacturing a flow restrictor nozzle 200 for a pressurized vessel of a nuclear reactor may comprise fabricating a nozzle body 202 including an inlet face 204 and an outlet face 206. The nozzle body 202 may define a plurality of internal flow paths extending from the inlet face 204 to the outlet face 206. Each of the plurality of internal flow paths may include a convergent section, a throat section, and a divergent section. The method may additionally comprise independently shaping, sizing, and positioning the convergent section of each of the plurality of internal flow paths on the inlet face 204 based on predicted pressure variances of the pressurized vessel. The method may further comprise independently spacing the throat section of each of the plurality of internal flow paths relative to the inlet face 204 to mitigate acoustic wave reinforcement.

The flow restrictor nozzle disclosed herein and the associated design, use, and manufacture thereof are discussed in further detail below in accordance with example embodiments of the present application. Described herein is a flow restrictor nozzle for use in steam generation vessels with features of compactness using multiple parallel paths, nozzle axis angling and inflow and outflow port shaping to control pressure variations, flow distribution, flow swirl, and acoustic pressure wave transmission. The flow restrictor nozzle is designed to be replaceable/renewable after installation. According to an example embodiment, the flow restrictor nozzle has no moving parts. The flow restrictor nozzle may be applied to new or existing vessels. The flow restrictor nozzle may be utilized in connection with steam service vessel flow restriction, in saturated or superheated state. However, it should be understood that the flow restrictor nozzle may also be applied in other vapor, gas, and/or liquid (e.g., water) applications with vessel flow restriction nozzle requirements.

Fluid mechanic principles are applied to address the problems affecting current nozzles. According to an example embodiment, multiple parallel flow paths are each formed using a combination of flow nozzle intake and Venturi nozzle discharge flow principles.

Inlet pressure fields and flows are generally non-uniform and unstable and often have entrained eddies and swirls. By application of advanced analytical flow simulations, the number of individual flow path ports, the port shapes, the angle of entry, port locations, accessory features, and individual throat sizes in a multiple parallel flow path restrictor nozzle can be correspondingly varied to mitigate the adverse effects of these inlet conditions. Inlet port surfaces can be smooth and uniform or may have convolutions or fluting. In addition, the shape can be circular, oval, elliptical, or an asymmetric version of oval or elliptical shapes.

The throat area can be uniform for all ports of a nozzle or can vary to take advantage of non-uniform pressure field prediction at the inlet so that the portion of the nozzle inlet face with higher pressure has a larger throat flow area while the inlet face portion with lower pressure has a smaller throat flow area. The total flow area is approximately equivalent to the flow area of a single-path flow restrictor nozzle. The throat location within the nozzle can be at a uniform distance from the inlet surface or can be varied in accordance with acoustic analysis to prevent or reduce acoustic wave reinforcement at the inlet or outlet of the multiple-path flow restrictor nozzle.

Discharge nozzles are relatively shallow angle, following the engineering rules for Venturi expansions, to obtain maximum pressure recovery with minimum total pressure loss from the throat to the nozzle outlet face. Discharge nozzles can be in parallel to a single straight pipeline axis that is orthogonal to the nozzle outlet end. Alternatively, the outlet flow paths from the throat section can be angled by several degrees to optimize the piping connection interface at the nozzle outlet end. Accessory features may include inlet or outlet anti-swirl (flow straightening) blades, varying thickness of erosion resistant weld overlay material, and pressure sensor taps.

The entire nozzle may be formed as a single piece. Alternatively, the nozzle may be composed of two pieces, with the two-piece form permitting nozzle removal/replacement during the equipment service life. The nozzle form can be manufactured according to at least three approaches. In a first approach, the single piece multiple parallel flow path flow restrictor nozzle is a permanent form that is welded into a vessel during original shop fabrication. In a second approach, for original fabrication or retro-fit vessel modification, the first piece of a two-piece nozzle form is welded into a vessel and provides a socket or chamber into which a second multiport restrictor element piece is mechanically inserted and secured prior to unit service. In a third approach, for retro-fit vessel nozzle modification, the first piece is a mechanical locking mechanism that is inserted into place inside an existing nozzle bore using the principle of interference fit by material cryogenic shrink, with an external mechanical pattern that seals and locks the piece permanently as it re-expands by thermal equalization. With the locking mechanism in place, a second multi-path restrictor element piece is mechanically inserted and secured prior to unit service.

By separating the mass flow through the nozzle into multiple sub-flows, the throat diameter of each flow path is decreased so that the total flow restrictor function is satisfied by the sum effect of the parallel flow path restrictions, which reduces the overall recovery length of the Venturi discharges so that the overall nozzle is much shorter than the equivalent single flow path nozzle. The multiple-path flow restrictor nozzle's total diameter remains very close to that of the equivalent single-path nozzle so that vessel fabrication impact is negligible. The nozzle length is a function of the Venturi discharge expansion length which is directly proportional to throat orifice diameter. A shortened flow recovery length from the smaller throat orifices of individual paths to the nozzle discharge face makes the nozzle compact enough to be fully installed into the vessel during shop fabrication and requires no expensive, time-consuming, and space-consuming field fitting, welding, and heat treatment of nozzle extensions to complete the vessel nozzle fabrication after field placement.

By reshaping and resizing the port inlets, the mass flow per unit area of the flow paths can be equalized by more closely matching the available flow area to the inlet pressure distribution at the nozzle inlet face. As a result, the flows then pass through the parallel flow paths at equal velocity. This contributes to minimizing the potential for generating adverse flow phenomena in any individual flow path due to relative flow "starving" compared to other ports of the nozzle, and to eddies at the nozzle exit or downstream flow area displacement caused by recirculating-flow stall conditions due to recombination of individual path flows at different velocities.

For example, by selection of the number of port inlets, the individual port throat diameters, and their relative location on the nozzle inlet face, steam flow interference between the main steam nozzle elevation and the BWR reactor vessel steam dryer structure elevation can be mitigated. With the asymmetric inlet arrangement, the capability of manufacturing the individual flow paths at small angles to the nozzle's nominal centerline axis permits redistribution of the discharge ports to uniformly fill the exit flow area at the nozzle outlet face.

Acoustic waves generated in the piping downstream from the nozzle can cause damage to vessel internal structures by high-cycle fatigue. Low frequency acoustic waves carry the most energy and are the most capable of causing metal fatigue failure of vessel internal structures. The acoustic pressure waves are partially attenuated by the multiple parallel flow path flow restrictor nozzle by reflection of some of the wave energy. The remainder of the wave energy is subject to frequency conversion and energy division by individual higher frequency wave packets that are generated in each of the smaller diameter parallel flow paths of the nozzle. Acoustic detuning of the design avoids having these transmitted higher frequency wave packets recombine to reinforce each other. Therefore, the energy impulses that reach the vessel internal structures are further from internal structure resonance frequencies and are of lower energy. This mitigates the potential for internal structure failure from piping system acoustically induced high-cycle fatigue.

Accessory features of the nozzle design are used to further enhance performance, improve mass-energy transmission efficiency, and assist in flow monitoring. For minimizing flow swirl, fluted inlets may be used to enhance flow entry in the direction of the flow axis and disrupt parasitic drag phenomena caused by swirl. The apexes may be sharply peaked to trip cross-flows, or are joined to form flow straightening blades (foils, vane such as a bisecting blade, tri-blade or quad-blade pattern. Additionally, flow-straightening blades can be included at the individual Venturi expansion outlets to limit swirl development due to transition eddies formed before the flow reaches full pipe diameter. The anti-swirl blades may stabilize flow streams by canceling the cross-flow streams that are a source of drag and downstream eddies.

By angling the discharge Venturi expansion nozzles even a few degrees, the location of the nozzle discharge face connection to piping can be adjusted to improve the system piping interface, reducing the required pipe bends that tend to re-introduce swirl in the downstream flow.

The variation of weld metal overlay addresses areas with higher erosion potential and allows for flow path shaping during fabrication by selective machining and smoothing of the surface.

Pressure sensing ports can measure upstream (inlet face) and throat pressures so that the mass flow rate through the nozzle can be determined using a differential pressure to flow rate equivalency.

By optionally using the two-piece multiple parallel flow path flow restrictor nozzle, wear and erosion that occur during service can be managed by removal, and refurbishment or replacement of the multi-port restrictor element piece. This also permits modification to increase or reduce the restrictor nozzle total mass flow capacity without incurring a modification to the vessel's pressure boundary.

The nozzle design herein substantially reduces the pressure losses caused by flow swirl that has been analytically demonstrated, and is evidenced by an observable polishing effect on steam dryer outer bank surfaces directly opposite the steam nozzles.

Improved steam flow delivery increases the potential megawatt-electric output of the unit without adding additional core energy.

Elimination of field vessel fabrication steps of the current restrictor nozzle design saves significant construction cost. The improved interface with the main steam piping also contributes to improved steam delivery.

The compact design of the multiple-path flow restrictor nozzle allows the complete nozzle to be installed into the pressure vessel without interference with other structures surrounding the vessel or in the vicinity of the steam nozzles.

For retrofit plants, replacement of the in-line Venturi restrictor with a vessel multiple-path flow restrictor nozzle design will reduce LOCA consequences compared to the current unrestricted steam pipe break assumption.

The acoustic wave attenuation reduces the cyclic loading of the steam dryer assembly due to downstream acoustic generators (e.g., relief valve branch piping). This mitigates the potential for dryer failures. Furthermore, the smaller flow path orifices of the multiple-path flow restrictor nozzle design would effectively block all but the smaller pieces of debris from being discharged into the steam lines. This debris screening is especially effective if the nozzle design installed in any particular plant's vessel includes inlet, outlet, or inlet and outlet flow straightening blades.

In addition, the partial blockage of acoustic waves includes impulse or shock waves due to sudden valve closures in the downstream piping system, mitigating the transient loads experienced by the vessel internals. This consequently facilitates faster closure times for closing the downstream piping to reduce mass discharge early in a steam system transient event.

Designing the restrictor nozzle for initial thick-overlay cladding provides a built-in means to adapt the nozzle for a power/flow increase in later service by permitting a portion of the clad to be machined away for a re-profiling of the pathways and recertification of the restrictor nozzle's capacity rating.

The two-piece design described herein simplifies the original component parts shop fabrication. This concept also permits routine inspection of the restrictor element outside the vessel. Away-from-vessel maintenance facilitates and simplifies refurbishment or replacement of the restrictor element because no welding is involved and all work can be performed in a controlled shop environment. Performing maintenance work remotely from the vessel considerably reduces the material risk of damaging the vessel or losing foreign material in the vessel, and reduces the risk to maintenance personnel performing the work. It also allows use of standard precision shop tools and more accurate and complex methods than possible with in-situ inspection or repair. The ability to swap out restrictor elements permits rapid refitting of a vessel for a change in the design mass flow rate because a new insert piece can be fabricated and certified in advance of the change.

Because no welding to the vessel is needed, the material selection options for fabricating the restrictor element insert can make use of a broader selection of available corrosion or erosion resistant materials and alloys, which are also thermally compatible with the vessel and main nozzle chamber base material.

By designing a multiple-path flow steam flow restrictor element with integral pressure-sensing ports for the inlet face static pressure and the dominant path (e.g., central port) Venturi throat pressure, the restrictor nozzle can be calibrated and capacity certified in a test stand. This can be performed external from the plant. The differential-pressure instrumentation connections for the nozzle are simplified and provide assurance of accurate in-service measurement of the nozzle performance.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A flow restrictor nozzle for a pressurized vessel of a nuclear reactor, comprising:
a nozzle body including an inlet face and an outlet face, the nozzle body being a monolithic structure defining a plurality of internal flow paths extending from the inlet face to the outlet face, each of the plurality of internal flow paths including a convergent section, a throat section, and a divergent section, the plurality of internal flow paths including a central flow path and peripheral flow paths surrounding the central flow path, the throat section of the central flow path being father from the inlet face of the nozzle body than the throat section of each of the peripheral flow paths.

2. The flow restrictor nozzle of claim 1, wherein the nozzle body is a passive structure with no moving parts.

3. The flow restrictor nozzle of claim 1, wherein the plurality of internal flow paths extend in parallel through the nozzle body.

4. The flow restrictor nozzle of claim 1, wherein the throat section is closer to the inlet face than the outlet face of the nozzle body.

5. The flow restrictor nozzle of claim 1, wherein the convergent section has a first area at the inlet face, the divergent section has a second area at the outlet face, the throat section has a third area at a narrowest part of the throat section, and the third area is less than the first area and the second area.

6. The flow restrictor nozzle of claim 1, wherein the convergent section has a first length, the divergent section has a second length, and the first length is less than the second length.

7. The flow restrictor nozzle of claim 1, wherein the nozzle body further defines a channel extending from an exterior of the nozzle body to at least one of the central flow path and the peripheral flow paths.

8. The flow restrictor nozzle of claim 7, wherein the channel extends inward at an angle toward the inlet face of the nozzle body.

9. The flow restrictor nozzle of claim 7, wherein the channel extends between adjacent peripheral flow paths of the plurality of internal flow paths.

10. The flow restrictor nozzle of claim 7, wherein the channel extends to the throat section of at least one of the central flow path and the peripheral flow paths.

11. The flow restrictor nozzle of claim 7, wherein the nozzle body further includes a connection stub protruding from the exterior of the nozzle body, the connection stub defining an interior passage in fluidic communication with the channel.

12. The flow restrictor nozzle of claim 1, wherein the inlet face is part of a flanged section of the nozzle body.

13. The flow restrictor nozzle of claim 12, wherein the inlet face of the nozzle body is concave.

14. The flow restrictor nozzle of claim 1, wherein the nozzle body includes a protruding rim surrounding the outlet face.

15. A method of restricting a flow from a pressurized vessel of a nuclear reactor, comprising:
securing a flow restrictor nozzle to the pressurized vessel, the flow restrictor nozzle having a nozzle body including an inlet face and an outlet face, the nozzle body being a monolithic structure defining a plurality of internal flow paths extending from the inlet face to the outlet face, each of the plurality of internal flow paths including a convergent section, a throat section, and a divergent section, the plurality of internal flow paths including a central flow path and peripheral flow paths surrounding the central flow path, the throat section of the central flow path being father from the inlet face of the nozzle body than the throat section of each of the peripheral flow paths; and
directing the flow from the pressurized vessel through the plurality of internal flow paths of the flow restrictor nozzle.

16. The method of claim 15, wherein the securing includes welding the flow restrictor nozzle to an exterior of the pressurized vessel.

17. The method of claim 15, wherein the securing includes attaching a first section of the flow restrictor nozzle to the pressurized vessel and attaching a second section of the flow restrictor nozzle to the first section.

18. The method of claim 15, wherein the directing of the flow results in a choked flow exiting the flow restrictor nozzle.

19. The method of claim 15, wherein the directing of the flow results in a stabilized flow exiting at equal velocity from the flow restrictor nozzle.

20. A method of manufacturing a flow restrictor nozzle for a pressurized vessel of a nuclear reactor, comprising:
fabricating a nozzle body including an inlet face and an outlet face, the nozzle body being a monolithic structure defining a plurality of internal flow paths extending from the inlet face to the outlet face, each of the plurality of internal flow paths including a convergent section, a throat section, and a divergent section, the plurality of internal flow paths including a central flow path and peripheral flow paths surrounding the central flow path;
independently shaping, sizing, and positioning the convergent section of each of the plurality of internal flow paths on the inlet face based on predicted pressure variances of the pressurized vessel, the throat section of the central flow path being father from the inlet face of the nozzle body than the throat section of each of the peripheral flow paths; and
independently spacing the throat section of each of the plurality of internal flow paths relative to the inlet face to mitigate acoustic wave reinforcement.

* * * * *

UNITED STATES PATENT AND TRADEMARK OFFICE
CERTIFICATE OF CORRECTION

PATENT NO. : 11,232,874 B2
APPLICATION NO. : 15/845277
DATED : January 25, 2022
INVENTOR(S) : Melito et al.

It is certified that error appears in the above-identified patent and that said Letters Patent is hereby corrected as shown below:

In the Claims

Column 13, Lines 9-21 should read:
1. A flow restrictor nozzle for a pressurized vessel of a nuclear reactor, comprising:
    a nozzle body including an inlet face and an outlet face, the nozzle body being a monolithic structure defining a plurality of internal flow paths extending from the inlet face to the outlet face, each of the plurality of internal flow paths including a convergent section, a throat section, and a divergent section, the plurality of internal flow paths including a central flow path and peripheral flow paths surrounding the central flow path, the throat section of the central flow path being farther from the inlet face of the nozzle body than the throat section of each of the peripheral flow paths.

Column 14, Lines 6-24 should read:
15. A method of restricting a flow from a pressurized vessel of a nuclear reactor, comprising:
    securing a flow restrictor nozzle to the pressurized vessel, the flow restrictor nozzle having a nozzle body including an inlet face and an outlet face, the nozzle body being a monolithic structure defining a plurality of internal flow paths extending from the inlet face to the outlet face, each of the plurality of internal flow paths including a convergent section, a throat section, and a divergent section, the plurality of internal flow paths including a central flow path and peripheral flow paths surrounding the central flow path, the throat section of the central flow path being farther from the inlet face of the nozzle body than the throat section of each of the peripheral flow paths; and
    directing the flow from the pressurized vessel through the plurality of internal flow paths of the flow restrictor nozzle.

Column 14, Lines 37-58 should read:
20. A method of manufacturing a flow restrictor nozzle for a pressurized vessel of a nuclear reactor, comprising:
    fabricating a nozzle body including an inlet face and an outlet face, the nozzle body being a monolithic structure defining a plurality of internal flow paths extending from the inlet face to the outlet face, each of the plurality of internal flow paths including a convergent section, a throat section, Signed and Sealed this
Twelfth Day of July, 2022

Katherine Kelly Vidal
*Director of the United States Patent and Trademark Office* and a divergent section, the plurality of internal flow paths including a central flow path and peripheral flow paths surrounding the central flow path;

independently shaping, sizing, and positioning the convergent section of each of the plurality of internal flow paths on the inlet face based on predicted pressure variances of the pressurized vessel, the throat section of the central flow path being farther from the inlet face of the nozzle body than the throat section of each of the peripheral flow paths; and independently spacing the throat section of each of the plurality of internal flow paths relative to the inlet face to mitigate acoustic wave reinforcement.